(12) United States Patent
Parniske et al.

(10) Patent No.: US 10,724,679 B2
(45) Date of Patent: Jul. 28, 2020

(54) PONTOON CANVAS CLIP

(71) Applicant: Taylor Made Group, LLC, Gloversville, NY (US)

(72) Inventors: Dennis J. Parniske, Parrish, FL (US); Robert R. Shearer, Bradenton, FL (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 0 days.

(21) Appl. No.: 16/049,162

(22) Filed: Jul. 30, 2018

(65) Prior Publication Data

US 2019/0032844 A1     Jan. 31, 2019

Related U.S. Application Data

(60) Provisional application No. 62/539,236, filed on Jul. 31, 2017.

(51) Int. Cl.
| | |
|---|---|
| *F16M 13/02* | (2006.01) |
| *B63B 17/02* | (2006.01) |
| *F16B 2/06* | (2006.01) |
| *F16M 11/04* | (2006.01) |
| *G09F 9/00* | (2006.01) |
| *G09F 15/00* | (2006.01) |

(52) U.S. Cl.
CPC .......... *F16M 13/022* (2013.01); *B63B 17/02* (2013.01); *F16B 2/065* (2013.01); *F16M 11/04* (2013.01); *F16M 11/041* (2013.01); *F16M 11/045* (2013.01); *F16M 13/02* (2013.01); *G09F 9/00* (2013.01); *G09F 15/0025* (2013.01)

(58) Field of Classification Search
CPC ...... F16B 2/065; F16B 5/0635; F16B 5/0692; F16B 33/006; F16B 2/22; F16M 13/022
USPC .............. 248/222.14, 229.16, 229.26, 316.7; 40/658, 666, 764, 124.05; 114/361; 24/458
See application file for complete search history.

(56) References Cited

U.S. PATENT DOCUMENTS

| | | | | |
|---|---|---|---|---|
| 1,867,276 A | * | 7/1932 | McIntyre | ................... G09F 1/14 |
| | | | | 248/231.71 |
| 2,937,652 A | * | 5/1960 | Zimmer, Jr. | ............ B63B 17/02 |
| | | | | 135/124 |
| 2,961,725 A | * | 11/1960 | McGee | ................. F16B 5/0692 |
| | | | | 114/361 |
| 3,478,801 A | * | 11/1969 | Van Niel | ............... F16B 37/041 |
| | | | | 411/112 |
| 4,027,413 A | | 6/1977 | Moede | |
| 4,692,969 A | | 9/1987 | Johnson | |
| 4,991,329 A | | 2/1991 | Wilson | |
| 5,662,133 A | | 9/1997 | Guido, Jr. | |

(Continued)

*Primary Examiner* — Muhammad Ijaz
(74) *Attorney, Agent, or Firm* — Nixon & Vanderhye P.C.

(57) ABSTRACT

A clip assembly secures a flexible material to a profile with a receiving channel. An exemplary profile is a pontoon fence rail. The clip assembly includes a clip bracket with a material connecting section and a profile connecting section. The material connecting section has an aperture, and the profile connecting section has a connection tab. A connector includes a shaft and a cap. The shaft is insertable through the flexible material into the aperture of the material connecting section. The connection tab is releasably engageable with the receiving channel with the flexible material sandwiched between the material connecting section and the cap of the connector.

13 Claims, 6 Drawing Sheets

(56) References Cited

U.S. PATENT DOCUMENTS

| | | | | |
|---|---|---|---|---|
| 5,839,388 | A | * | 11/1998 | Vadney .................. B63B 17/02 114/361 |
| 5,970,904 | A | | 10/1999 | Wellen et al. |
| 6,588,361 | B2 | | 7/2003 | Biedenweg |
| 7,325,779 | B2 | | 2/2008 | Taylor |
| 2002/0069812 | A1 | * | 6/2002 | Biedenweg ............. B63B 17/02 114/361 |
| 2003/0015859 | A1 | * | 1/2003 | Nakazawa ........... B60R 21/213 280/728.2 |
| 2003/0230690 | A1 | * | 12/2003 | Ostrovsky ............... F01D 15/10 248/316.7 |
| 2005/0183652 | A1 | * | 8/2005 | Whited, II ............. B63B 17/02 114/361 |
| 2015/0211556 | A1 | * | 7/2015 | Alexander ................ F16B 2/22 114/361 |
| 2016/0311505 | A1 | * | 10/2016 | Oakes ....................... F16B 1/00 |
| 2016/0355144 | A1 | * | 12/2016 | Horneck ............ B60R 13/0206 |
| 2018/0347606 | A1 | * | 12/2018 | Stone ....................... F16B 2/22 |

* cited by examiner

PONTOON CANVAS CLIP

CROSS-REFERENCES TO RELATED APPLICATIONS

This application claims the benefit of U.S. Provisional Patent Application No. 62/539,236, filed Jul. 31, 2017, the entire content of which is herein incorporated by reference.

STATEMENT REGARDING FEDERALLY SPONSORED RESEARCH OR DEVELOPMENT (NOT APPLICABLE)

BACKGROUND

The invention relates to clip assembly for discretely attaching flexible materials to a profile containing a receiver channel. In an exemplary application, canvas is attached to a pontoon boat rail containing a cavity by use of discretely located fasteners that are easily located, installed and removable.

There are many applications where it is desirable to secure a flexible material to a profile such as a pontoon boat rail or the like. Existing assemblies typically utilize snaps or similar fasteners that may be difficult to secure to the profile. Parts of snap connectors may be disadvantageously made of materials that corrode in a marine environment. Often, the fasteners secured to the pontoon fence rail may be formed of a different material than that secured to the canvas, resulting in potential dissimilar metal corrosion, e.g., using a stainless steel or nickel plated brass fastener installed into an aluminum rail.

Another problem with existing snap connector systems is that the snaps on the canvas must line up with the snaps on the profile to properly fasten the canvas to the profile. Over time, the canvas material may shrink or otherwise change its shape, particularly in a marine environment, and it may become difficult to align the snap connectors. A similar problem may arise when a new replacement cover is purchased, and the snaps of the replacement cover do not line up with the existing snaps on the profile.

BRIEF SUMMARY

It thus would be desirable to provide a profile canvas clip assembly that can be readily secured to a profile such as a pontoon boat rail or the like that overcomes the drawbacks with existing systems. The pontoon canvas clip assembly of the described embodiments serves to connect a flexible material such as a canvas or the like discretely to a profile with a receiver channel. The clip is a multi-part or material clip with a soft flexible adapter part that can be changed to adapt to any groove in a pontoon fence rail. A soft abrasion backing on the clip will not scratch the surface to which it is attached. The clip inserts through the canvas fabric and mates to a male portion that secures the canvas clip tight to the canvas. Once fastened to the fabric, the clip may be inserted into the groove of the profile and hold the canvas tight. The canvas clip can be released by merely pushing down on top of the clip.

In an exemplary embodiment, a clip assembly secures a flexible material to a profile with a receiving channel. The clip assembly includes a clip bracket with a material connecting section and a profile connecting section, where the material connecting section has an aperture, and where the profile connecting section has a connection tab. A connector includes a shaft and a cap, where the shaft is insertable through the flexible material into the aperture of the material connecting section. The connection tab is releasably engageable with the receiving channel with the flexible material sandwiched between the material connecting section and the cap of the connector. The material connecting section and the profile connecting section may be essentially perpendicular to each other such that the clip bracket may be essentially L-shaped. The shaft of the connector may include a ridge such that the connector may be securable in the aperture of the material connecting section in a snap fit. The cap of the connector may include a soft abrasion backing on a side of the cap facing the profile. The profile connecting section may be configured to be adaptable to the receiving channel. In this context, the profile connecting section may include a base and an adapter removably securable to the base, where the connection tab is positioned on the adapter.

In another exemplary embodiment, a profile assembly includes a profile including a receiving channel, a flexible material, and the clip assembly securing the flexible material to the profile. In some embodiments, the profile may have a height and a width, where the material connecting section is sized substantially corresponding to the profile height, and where the profile connecting section is sized substantially corresponding to the profile width. The flexible material adjacent the material connecting section may include a reinforced section, where the reinforced section may include a hole therethrough, and the shaft is inserted through the hole in the reinforced section of the flexible material. The flexible material may extend along a first side of the profile in a first direction, extend across a top of the profile, and extend along a second side of the profile in a second direction. In this context, the second direction may be opposite to the first direction.

In yet another exemplary embodiment, a method of securing a flexible material to a profile with a receiving channel using a clip assembly includes the steps of (a) inserting the shaft of the connector through the flexible material and into the aperture in the material connecting section of the clip bracket; and (b) securing the connection tab of the profile connecting section in the receiving channel of the profile such that the flexible material is sandwiched between the clip assembly and the profile. The clip assembly may be removed after step (b) by pushing down on the clip bracket.

BRIEF DESCRIPTION OF THE DRAWINGS

These and other aspects and advantages will be described in detail with reference to the accompanying drawings, in which.

DETAILED DESCRIPTION

Figure 1:
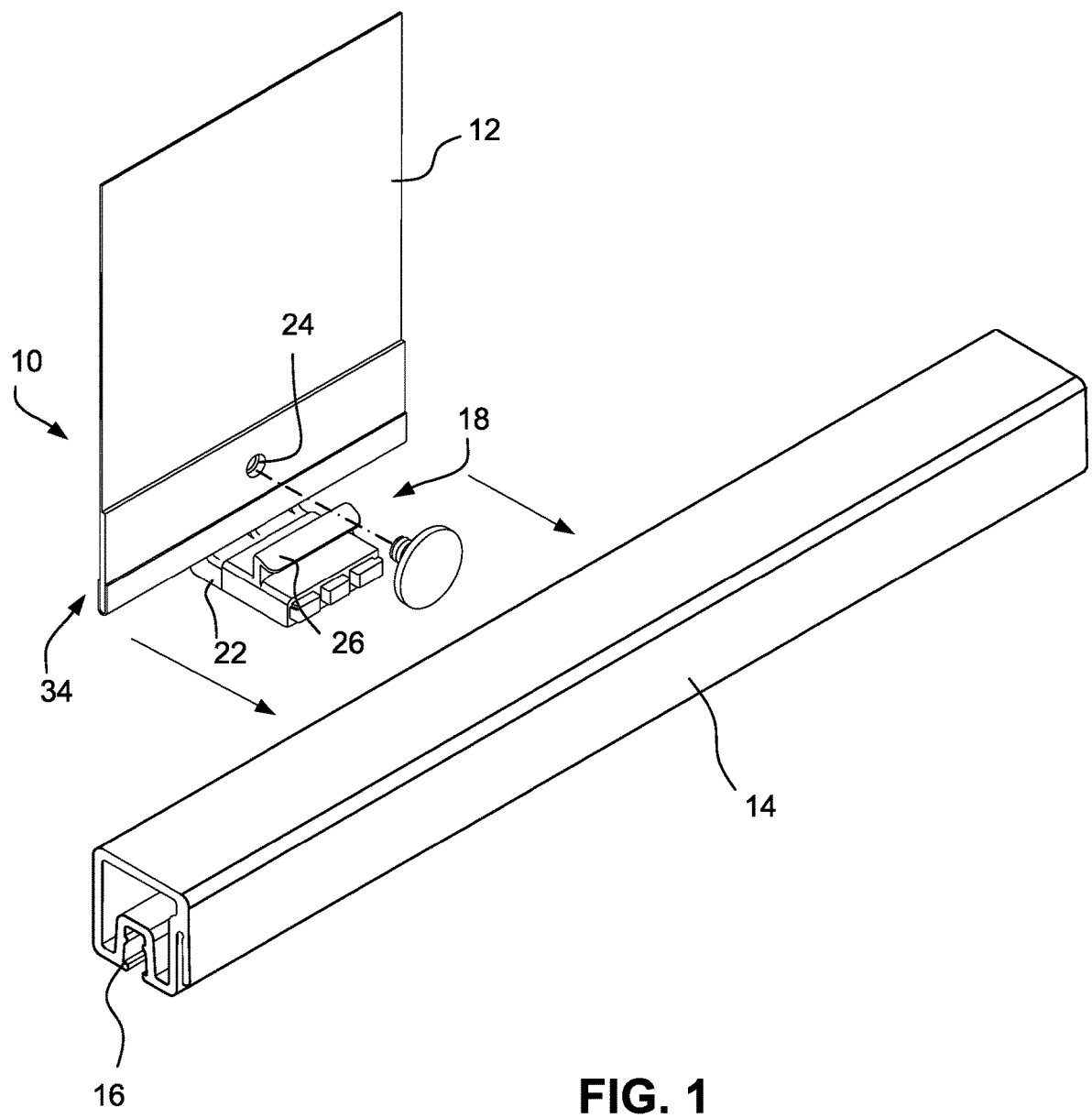
FIGS. 1, 2 and 2A are exploded perspective views of the clip assembly according to the described embodiments.

With reference to FIGS. 1-4, a clip assembly 10 secures a flexible material 12 to a profile 14 including a receiving channel 16. The clip assembly 10 includes a clip bracket 18 with a material connecting section 20 and a profile connecting section 22. The material connecting section 20 is provided with an aperture 24, and the profile connecting section 22 is provided with a connection tab or bar 26. As shown, the material connecting section 20 and the profile connecting section 22 are essentially perpendicular to each other such that the clip bracket 18 is essentially L-shaped.

Figure 2:
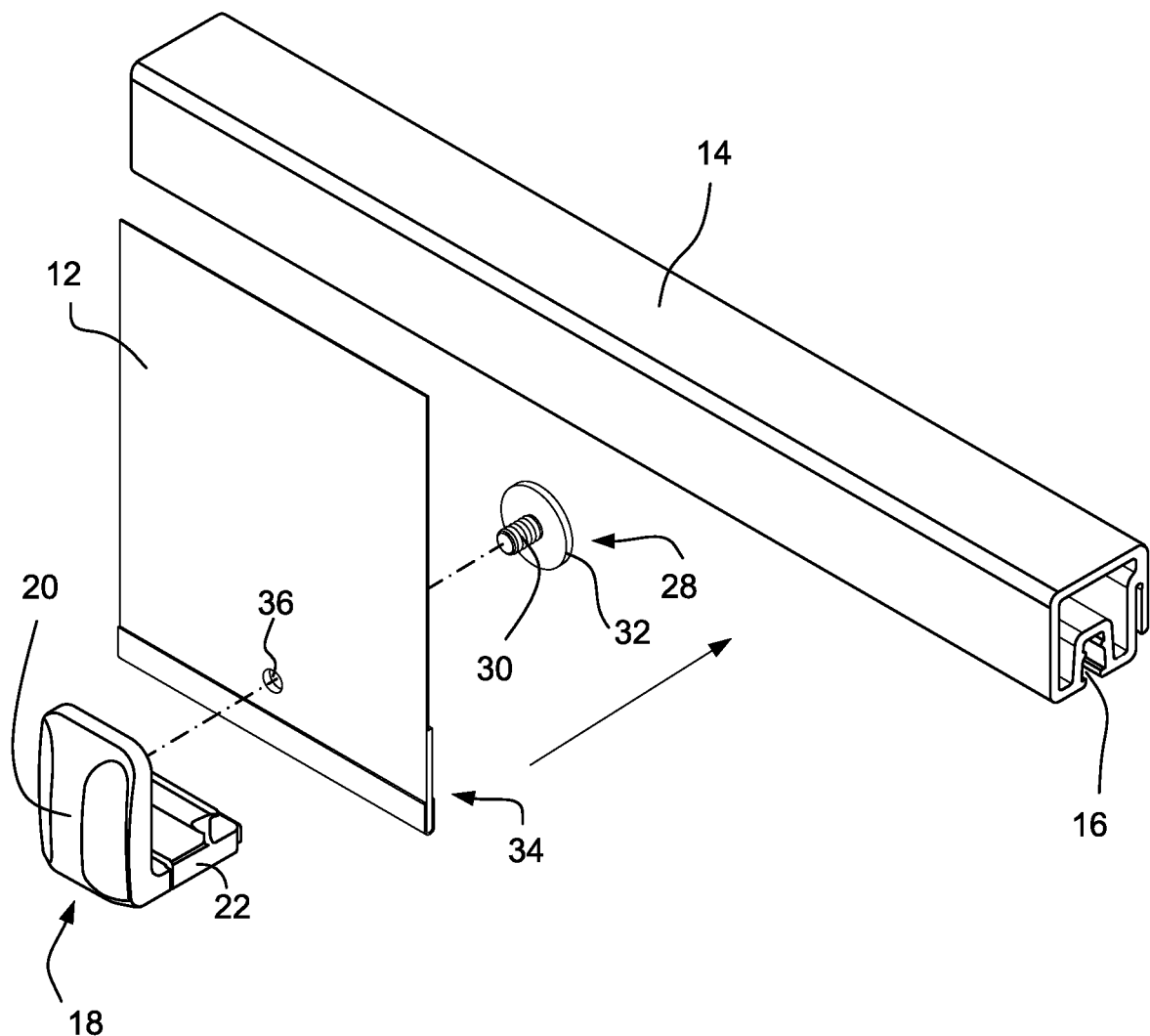
Figure 2A:
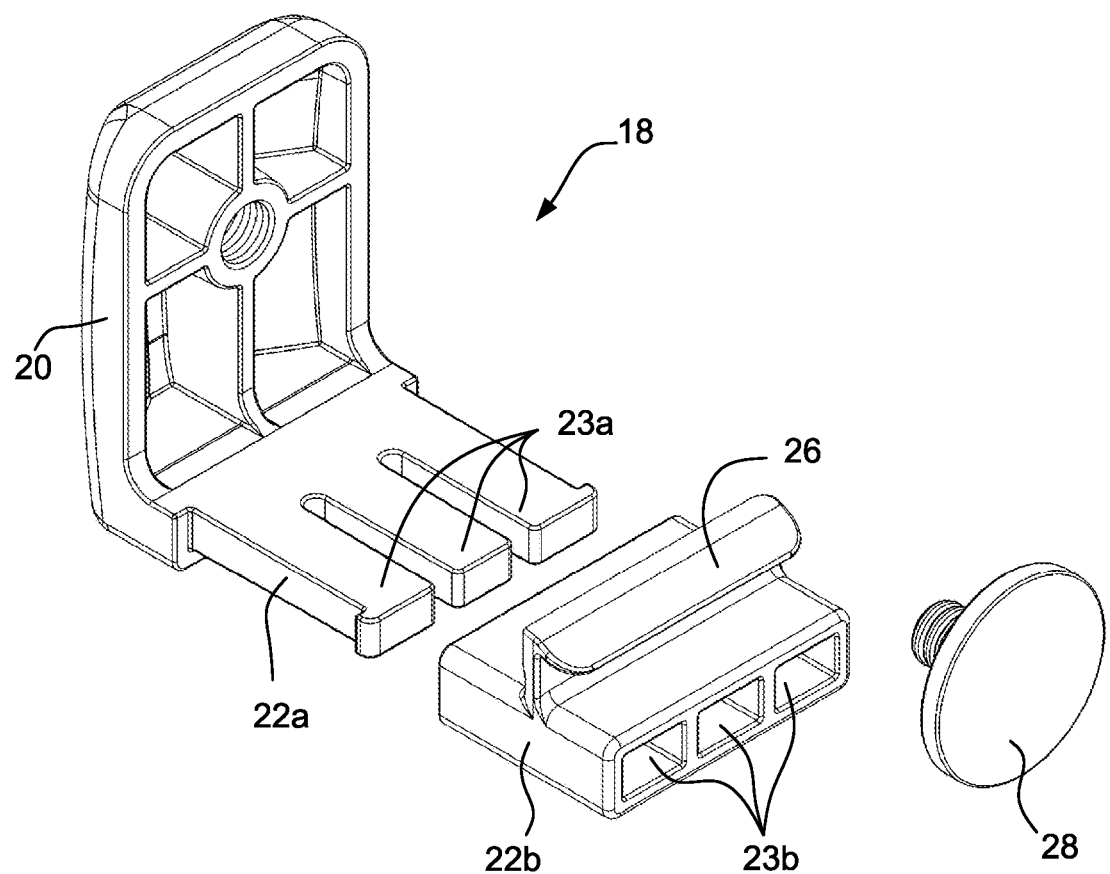

The profile connecting section 22 may be composed of a base 22a and an adapter 22b removably securable to the base 22a (see FIG. 2A). In the embodiment shown in FIG. 2A, the base 22a includes rigid or deflectable fingers 23a, and the adapter 22b includes corresponding finger openings 23b. To secure the adapter with rigid fingers 23a, the material of the adapter 22b around the finger openings of 23b expands to fit the fingers 23a. To secure the adapter 22b with deflectable fingers 23a, the fingers of the base 22a may be inserted through the finger openings in the adapter 22b where the outermost deflectable fingers are deflected inward until ends of the fingers protrude from the openings, and the deflectable fingers snap into engagement to secure the adapter 22b. The adapter 22b can be removed by expanding the material of the adapter 22b (in the rigid fingers embodiment) or by displacing the deflectable fingers inward (in the deflectable fingers embodiment). The connection tab or bar 26 forms part of the adapter 22b and is releasably engageable with the receiving channel 16 in the profile 14. The adapter 22b can be thus changed if necessary to adapt the connection tab or bar 26 to any shape and/or position of the receiving channel 16 in the profile 14.

Figure 3:
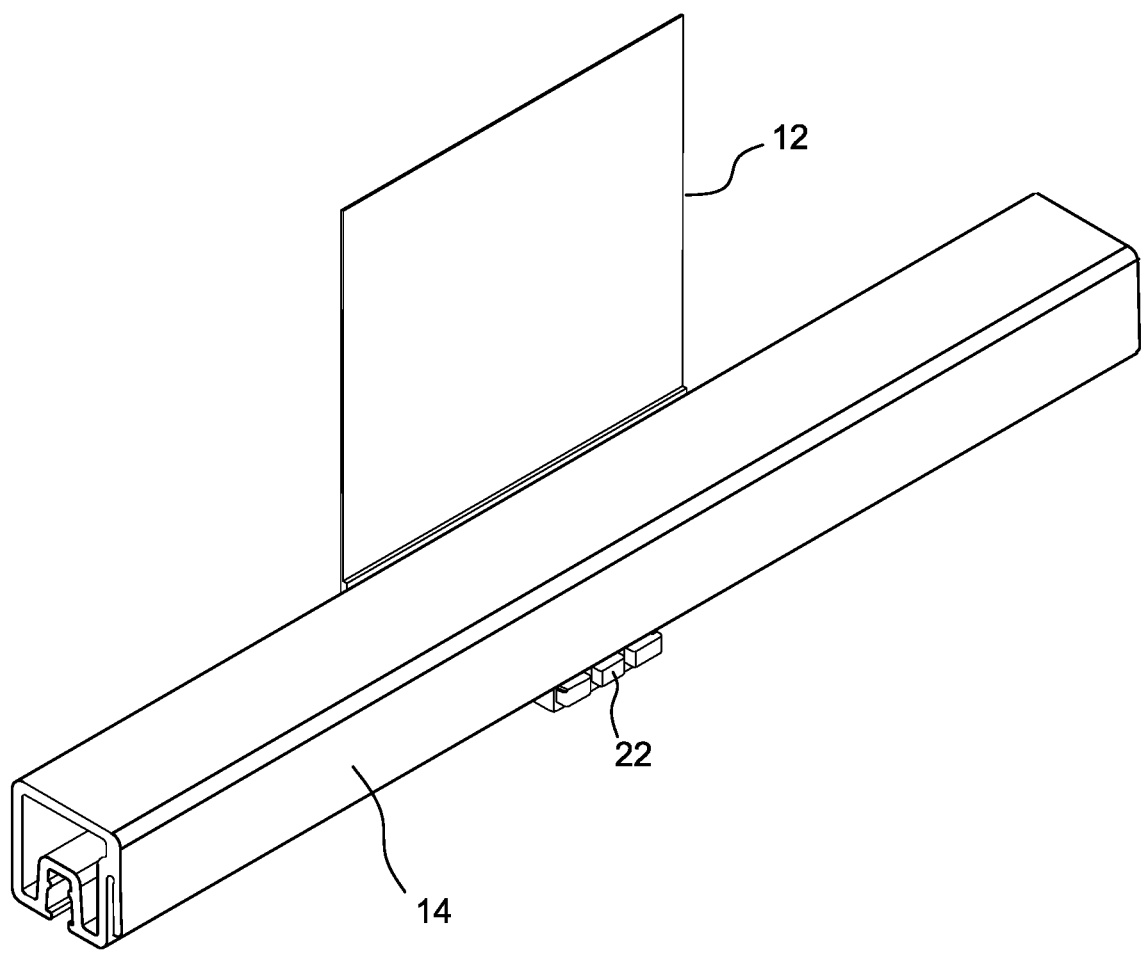
FIGS. 3 and 4 show the clip assembly secured to a profile with a receiving channel.
Figure 4:
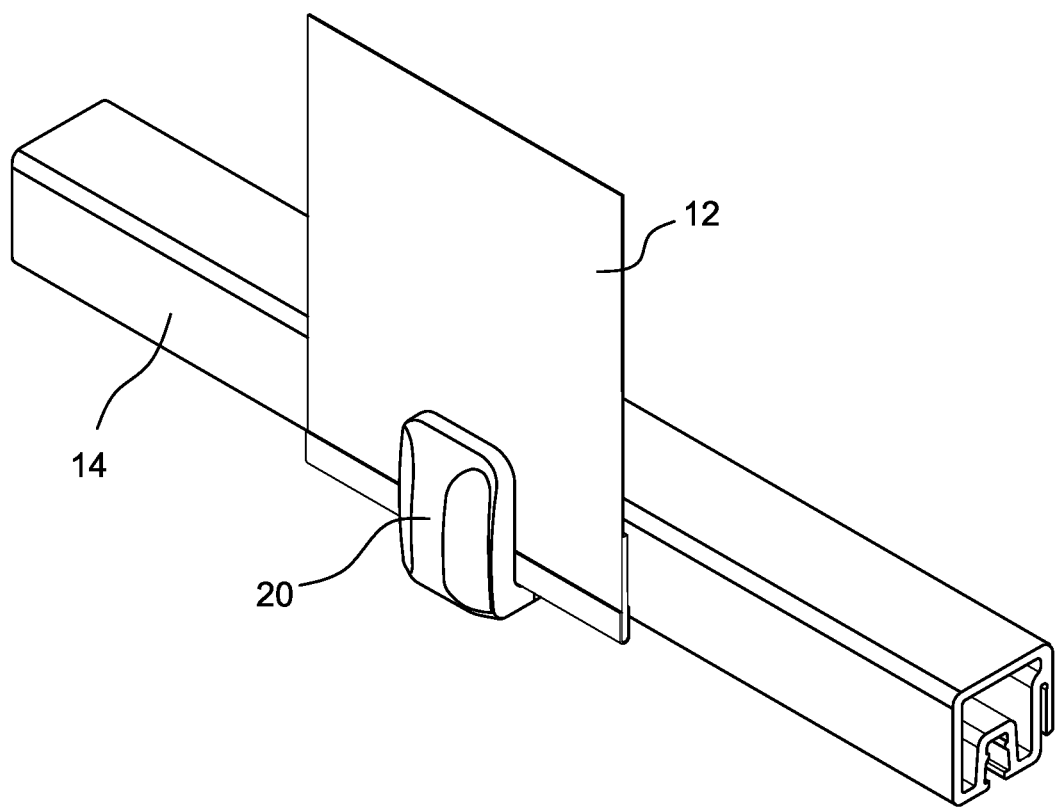

The clip assembly 10 also includes a connector 28 having a shaft 30 and a cap 32. The shaft 30 is insertable through the flexible material 12 into the aperture 24 of the material connecting section 20. As assembled as shown in FIGS. 3 and 4, the flexible material 12 is sandwiched between the material connecting section 20 and the cap 32 of the connector 28.

In some embodiments, the shaft 30 of the connector 28 is provided with a ridge or similar structure such that the connector 28 is securable in the aperture 24 of the material connecting section 20 in a snap fit. The cap 32 of the connector may include a soft abrasion backing such as one portion of a hook and loop fastener on a side of the cap 32 facing the profile 14.

The profile 14 has a height and width, and in some embodiments, the material connecting section 20 is sized substantially corresponding to the profile height (see, e.g., FIG. 4), and the profile connecting section 22 is sized substantially corresponding to the profile width.

With continued reference to FIG. 1, the flexible material 12 adjacent the material connecting section 22 may include a reinforced section 34. This section 34 may be reinforced with webbing material to strengthen the edge and to not allow for the clip assembly to pull through the fabric. Alternatively, the material can be folded over to define the reinforced section. Other means of reinforcing the material may be utilized. The reinforced section 34 includes a hole 36 therethrough. The shaft 30 of the connector 28 is inserted through the hole 36 in the reinforced section 34 of the flexible material 12. The reinforced section 34 reinforces the flexible material 12 at the clip assembly.

In order to secure the flexible material using the clip assembly of the described elements, the shaft 30 of a connector 28 is inserted through the flexible material 12 and into the aperture 24 in the material connecting section 20 of the clip bracket 18. Subsequently, the connection tab or bar 26 of the profile connecting section 22 is secured in the receiving channel 16 of the profile 14 such that the flexible material 12 is sandwiched between the clip assembly and the profile 14. In the exemplary construction shown in FIG. 5, the flexible material 12 is positioned along a first side of the profile 14 in a first direction, then positioned across a top of the profile, then positioned along a second side of the profile in a second direction, which may be opposite to the first direction. The clip assembly can be removed by pushing down on the clip bracket 18. The connector can be changed or replaced by drilling into the center of the connector 28, and the parts will separate from the canvas.

Figure 5:
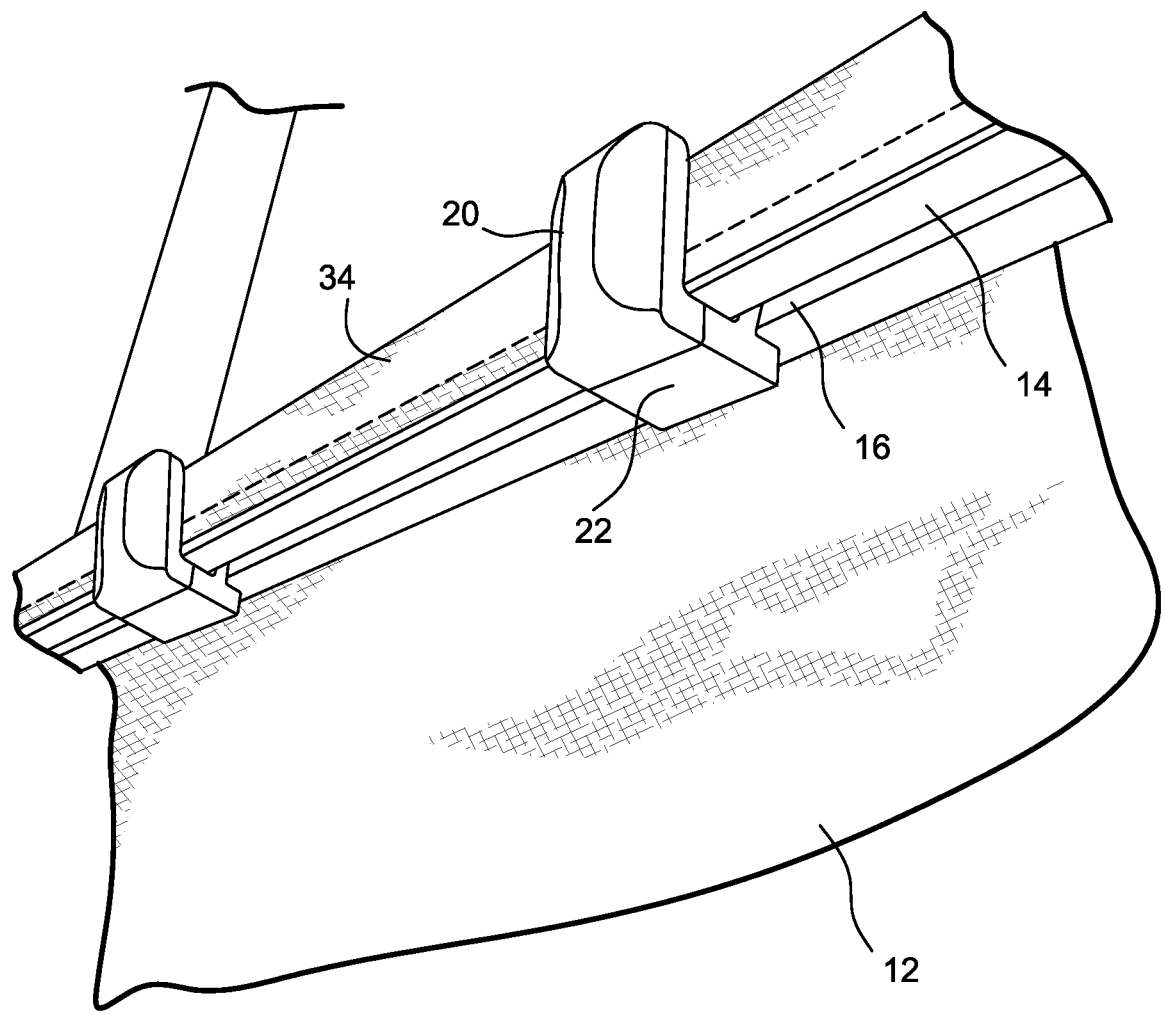
FIG. 5 shows an exemplary application with the clip assembly secured to a pontoon fence rail.

FIG. 5 shows an exemplary application with the clip assembly securing a canvas material to a pontoon fence rail. In the image shown, the profile 14 is the pontoon fence rail including the receiving channel 16. The flexible material 12 extends along a first side of the profile 14 in the first direction, extends across a top of the profile, and subsequently extends along a second side of the profile in the second direction. In the embodiment shown, the second direction is opposite to the first direction. That is, the flexible material 12 is secured to the pontoon fence rail and is folded up and over the pontoon fence rail.

The clip assembly of the described embodiments does not utilize potentially corrosive fasteners in the pontoon fence rail, and the plastic materials avoid the potential for dissimilar metal corrosion. Moreover, multiple clip assemblies can be secured at any position along the profile, and there is no need to line up snaps or the like to secure the canvas to the profile. The clip brackets are readily adjustable and can be moved around to account for loose or tight fitting canvas. The connection tab is easily pressed into the profile groove, and the clip brackets unfasten with a downward motion on top of the clip. The clips are secure enough that trailering wind will not pop the clip off. The clip assembly is configured such that when the cover is removed, there are no fasteners that remain on the rail. Additionally, any cover can be replaced without expensive installation labor since there are no snaps secured on the profile, and there are no snaps that have to match up with the new replacement cover. Still further, drilling is not required to install the cover, thereby reducing labor costs.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A clip assembly for securing a flexible material to a profile with a receiving channel, the clip assembly comprising:
    a clip bracket including a material connecting section and a profile connecting section defining an L-shape, wherein the material connecting section comprises an aperture, and wherein the profile connecting section comprises a connection tab extending into an interior of the L-shape; and
    a connector including a shaft and a cap, the shaft being insertable through the flexible material into the aperture of the material connecting section with the cap on a side of the material connecting section facing the interior of the L-shape,
    wherein the connection tab is releasably engageable with the receiving channel with the flexible material sandwiched between the material connecting section and the cap of the connector.

2. A clip assembly according to claim 1, wherein the shaft of the connector includes a ridge such that the connector is securable in the aperture of the material connecting section in a snap fit.

3. A clip assembly according to claim 1, wherein the cap of the connector includes a soft abrasion backing on a side of the cap facing away from the material connecting section.

4. A clip assembly according to claim 1, wherein the profile connecting section is configured to be adaptable to the receiving channel.

5. A clip assembly according to claim 4, wherein the profile connecting section comprises a base and an adapter removably securable to the base, and wherein the connection tab is positioned on the adapter.

6. A profile assembly according to claim 5, wherein the base comprises a connecting finger, and wherein the adapter comprises a finger opening that is sized to receive the connecting finger in a snap fit.

7. A profile assembly comprising:
   a profile including a receiving channel;
   a flexible material; and
   a clip assembly securing the flexible material to the profile, the clip assembly comprising:
      a clip bracket including a material connecting section and a profile connecting section defining an L-shape, wherein the material connecting section comprises an aperture, and wherein the profile connecting section comprises a connection tab, and
      a connector including a shaft and a cap, the shaft being inserted through the flexible material into the aperture of the material connecting section,
   wherein the connection tab is releasably engageable with the receiving channel with the flexible material sandwiched between the material connecting section and the cap of the connector.

8. A profile assembly according to claim 7, wherein the profile has a height and a width, and wherein the material connecting section is sized substantially corresponding to a profile height, and wherein the profile connecting section is sized substantially corresponding to a profile width.

9. A profile assembly according to claim 7, wherein the flexible material adjacent the material connecting section comprises a reinforced section, and wherein the reinforced section includes a hole therethrough, wherein the shaft is inserted through the hole in the reinforced section of the flexible material.

10. A profile assembly according to claim 7, wherein the profile connecting section is configured to be adaptable to the receiving channel.

11. A profile assembly according to claim 10, wherein the profile connecting section comprises a base and an adapter removably securable to the base, and wherein the connection tab is positioned on the adapter.

12. A profile assembly comprising:
    a profile including a receiving channel;
    a flexible material; and
    a clip assembly securing the flexible material to the profile, the clip assembly comprising:
       a clip bracket including a material connecting section and a profile connecting section defining an L-shape, wherein the material connecting section comprises an aperture, and wherein the profile connecting section comprises a connection tab, and
       a connector including a shaft and a cap, the shaft being inserted through the flexible material into the aperture of the material connecting section,
    wherein the connection tab is releasably engageable with the receiving channel with the flexible material sandwiched between the material connecting section and the cap of the connector, wherein the flexible material extends along a first side of the profile in a first direction, extends across a top of the profile, and extends along a second side of the profile in a second direction.

13. A profile assembly according to claim 12, wherein the second direction is opposite to the first direction.

\* \* \* \* \*